United States Patent [19]

Brownscombe et al.

[11] Patent Number: 5,070,052

[45] Date of Patent: Dec. 3, 1991

[54] BASIC ZINC-CONTAINING ZEOLITE COMPOSITIONS

[75] Inventors: Thomas F. Brownscombe, Houston; Thomas C. Forschner, Richmond; Lynn H. Slaugh, Houston, all of Tex.

[73] Assignee: Shell Oil Company, Houston, Tex.

[21] Appl. No.: 586,120

[22] Filed: Sep. 21, 1990

[51] Int. Cl.$^5$ .......................... B01J 29/08; B01J 29/18
[52] U.S. Cl. ........................................ 502/60; 502/78; 502/79
[58] Field of Search ............................... 502/60, 78, 79

[56] References Cited

U.S. PATENT DOCUMENTS

| | | | |
|---|---|---|---|
| 2,947,709 | 8/1960 | Ray | 502/60 |
| 2,962,355 | 11/1960 | Brech et al. | 502/60 |
| 2,988,577 | 6/1961 | Sensel | 502/60 |
| 3,013,984 | 12/1961 | Breck | 502/79 |
| 3,013,986 | 12/1961 | Castor | 502/79 |

Primary Examiner—Carl F. Dees

[57] ABSTRACT

This invention relates to a composition comprising a zeolite and a zinc or a zinc plus an alkali metal and/or an alkaline earth metal compound wherein the sum of the amount of the zinc or zinc plus alkali metal and/or alkaline earth metal in the compound plus any metal cation exchanged into the zeolite is in excess of that required to provide a fully metal cation-exchanged zeolite. The catalyst is preferably activated before use as a catalyst by heating to 400° C. to 650° C., typically in a nitrogen or air atmosphere.

16 Claims, No Drawings 5,070,052

BASIC ZINC-CONTAINING ZEOLITE COMPOSITIONS

FIELD OF THE INVENTION

This invention relates to basic zeolites containing a basic component selected from zinc and zinc plus alkali(ne-earth) compound(s). The invention further relates to methods for the preparation of the subject zeolites and their use as catalysts.

BACKGROUND OF THE INVENTION

In co-pending U.S. patent applications Ser. No. 354,586, filed June 22, 1989 and Ser. No. 387,265, filed July 31, 1989, are disclosed basic zeolites containing excess alkali metal or alkaline earth metal over that required to fully exchange the zeolites. These basic zeolites are useful for catalyzing basic reactions.

It has now been found that by replacing all or part of the alkali or alkaline earth metal with zinc, a "softer" basic zeolite can be made. These soft zeolites can be used to catalyze those organic reactions wherein the use of stronger bases would cause degradation of the reacting organic substrate or reaction products. The use of a soft base such as zinc in the preparation of basic zeolites can result in higher retentions of zeolite crystallinity than does the use of the stronger bases such as alkalis and alkaline earth metals.

SUMMARY OF THE INVENTION

This invention relates to basic compositions comprising a zeolite and a metal compound wherein the metal is selected from the group consisting of zinc and zinc plus alkali(ne earth) metal wherein the sum of the amount of metal in the metal compound plus any metal in any cation exchanged into the zeolite is in excess of that required to provide a fully metal cation-exchanged zeolite. The catalyst is preferably activated before use by heating to 400° C. to 650° C., typically in a nitrogen or air atmosphere.

DETAILED DESCRIPTION OF THE INVENTION

Essentially any crystalline zeolitic aluminosilicate can be employed to prepare the catalysts utilized in the instant process. The zeolites can include both synthetic and naturally occurring zeolites. Illustrative of the synthetic zeolites are Zeolite X. U.S. Pat. Nos. 2,882,244; Zeolite Y. 3,130,007; Zeolite A, 2,882,243; Zeolite L, Bel. 575,117; Zeolite D, Can. 611,981; Zeolite R, 3,030,181; Zeolite S, 3,054,657; Zeolite T, 2,950,952; Zeolite Z, Can. 614,995; Zeolite E, Can. 636,931; Zeolite F, 2,995,358; Zeolite O, 3,140,252; Zeolite W, 3,008,803; Zeolite Q, 2,991,151; Zeolite M, 2,995,423; Zeolite H, 3,010,789; Zeolite J, 3,001,869; Zeolite W, 3,012,853; Zeolite KG, 3,056,654; Zeolite SL, Dutch 6,710,729; Zeolite Omega, Can. 817,915; Zeolite ZK-5, 3,247,195; Zeolite Beta 3,308,069; EU-1, 4,537,754; Zeolite ZK-4, 3,314,752; Zeolite ZSM-5, 3,702,886; Zeolite ZSM-11, 3,709,979; Zeolite ZSM-12, 3,832,449; Zeolite ZSM-20; 3,972,983; Zeolite ZSM-35, 4,016,245; Zeolite ZSM-50, 4,640,829; synthetic mordenite; the so-called ultrastable zeolites of U.S. Pat. Nos. 3,293,192 and 3,449,070; and the references cited therein, incorporated herein by reference. Other synthetic zeolites are described in the book "Zeolite Molecular Sieves-Structure, Chemistry and Use," by Donald W. Breck, 1974, John Wiley & Sons, incorporated by reference herein.

Illustrative of the naturally occurring crystalline zeolites are analcime, bikitaite, edingtonite, epistilbite, levynite, dachiardite, erionite, faujasite, analcite, paulingite, noselite, ferrierite, heulandite, scolecite, stilbite, clinoptilolite, harmotone, phillipsite, brewsterite, flakite, datolite, chabazite, gmelinite, cancrinite, leucite, lazurite, scolecite, mesolite, ptilolite, mordenite, nepheline, natrolite, scapolite, thomsonite, gismondine, garronite, gonnardite, heulandite, laumontite, levynite, offretite, yugawaralite. Descriptions of certain naturally occurring zeolites are found in the aforementioned book by Breck, in the book "Molecular Sieves-Principles of Synthesis and Identification", R. Szostak, Van Nostrand Reinhold, New York, 1989, both incorporated by reference herein, and in other known references. These zeolites may be in the herein, and in other known references. These zeolites may be in the hydrogen form or may be partially or fully exchanged with ammonium or metal ions.

The term "alkali(ne-earth) metal" as used hereinafter refers to a metal selected from the group consisting of alkali metal, alkaline earth metal and mixtures thereof, that is, it refers to alkali metal and/or alkaline earth metal and includes one or more alkali metals, one or more alkaline earth metals and two or more of a mixture of alkali metal(s) and alkaline earth metal(s).

As used herein, the word "compound" as used in the term "metal compound" metal refers to the combination of the metals(s) in question (zinc or zinc plus alkali(ne earth)) with one or more elements by chemical and/or physical and/or surface bonding, such as ionic and/or covalent and/or coordinate and/or van der Waals bonding, but specifically excludes that bonding involved between said metal and a zeolite when said metal is located in a cation exchange site of the zeolite. The term "ionic" or "ion" refers to an electrically charged moiety; "cationic" or "cation" being positive and "anionic" or "anion" being negative. The term "oxyanionic" or "oxyanion" refers to a negatively charged moiety containing at least one oxygen atom in combination with another element. An oxyanion is thus an oxygen-containing anion. It is understood that ions do not exist in vacuo, but are found in combination with charge-balancing counter ions. The term "oxidic" refers to a charged or neutral species wherein an element such as zinc or an alkali(ne-earth) metal is bound to oxygen and possibly one or more different elements by surface and/or chemical bonding. Thus, an oxidic compound is an oxygen-containing compound, which also may be a mixed, double, or complex surface oxide. Illustrative oxidic compounds include, by way of non-limiting example, oxides (containing only oxygen as the second element), hydroxides, nitrates, sulfates, carboxylates, carbonates, bicarbonates, oxyhalides, etc, as well as surface species wherein the zinc or alkali(ne-earth) metal is bound directly or indirectly to an oxygen either in the substrate or the surface. "Surface" as applied to zeolites and the instant catalysts refers to external surface as well as the internal pore surface, the internal surface being both the surface of the macropores and mesopores resulting from the agglomeration of individual particles or crystallites as well as the surface of the micropores and supercages that result from the intrinsic zeolite crystal structure. The term "salt" as used in the instant specification and claims is meant to encompass a single salt as well as mixtures of two or more salts. The term "alkali metal" is used herein as a descriptor of the elements of Group IA of the Periodic Table of the Elements (Li, Na, K, Rb, Cs, Fr). The term "alkaline earth metal" is used herein as a descriptor of the elements of Group IIA of the Periodic Table of the Elements (Be, Mg, Ca, Sr, Ba, Ra). Zinc metal and alkali(ne-earth) metal herein do not refer to the element in the metallic or zero valent state, but rather is a shorthand use for the element in the positive valent state, that is, it will be understood to be combined as a salt, compound, complex, etc. The term "basic" refers to having the characteristic of a base; e.g., when placed in a solution, a basic material will have a pH consistent with a base rather than an acid and, if a catalyst, will catalyze chemical reactions that are catalyzed by bases.

The zinc and alkali(ne-earth) metal salts that are suitable for preparing the catalysts utilized in the instant process are any salts that can be dissolved in a suitable impregnating solution or which can be melted to form their own impregnating solution or which can be sublimed and condensed on the zeolite or which can be precipitated out of solution onto the zeolite. Illustrative but non-limiting examples of suitable salts are zinc or alkali(ne-earth) metal bicarbonates, carbonates, chlorates, perchlorates, cyanides, hydroxides, iodates, nitrates, nitrites, sulfates, hydrogen sulfates, sulfites, dithionates, thiosulfates, alkoxides, carboxylates, sulfonates, iodates, halides and the like. Of the alkali(ne-earth) salts that can be utilized in the instant invention, the hydroxide salts, particularly of alkali metals, are less preferred since these strongly basic salts in high concentrations can contribute to a degradation of the crystallinity of the zeolite. Salts which can be solubilized in a suitable solution are preferred. Preferred salts are those which have an oxygen-containing anion or oxyanion or which can be precipitated in situ with an oxyanion. Useful salts are those which decompose at least in part upon calcination in the presence of the zeolite to provide an alkali(ne-earth) metal-oxygen-containing moiety (e.g., Na—O—, —Ca—O—, —Zn—O—, etc.), that is, produce an oxidic compound. When the zinc or alkali(ne-earth) metal salt is associated with an anion which does not contain oxygen it is necessary that the salt be precipitated in situ with a suitable oxyanion, or alternatively, after impregnation, the subsequent calcination is carried out in an oxygen-containing atmosphere to cause the salt to react with the oxygen to provide the zinc or alkali(ne-earth) metal-oxygen-containing moiety, that is, produce a zinc and/or alkali(ne-earth) metal oxidic compound. Decomposition can be indicated by the evolution of gases such as carbon oxides, nitrogen oxides, sulfur oxides etc. Decomposition will also be indicated by disappearance at least in part of the particular anionic form associated with the zinc or alkali(ne-earth) metal in the impregnation liquid. For example, when carboxylates and alkoxides are calcined the carboxylate and alkoxide moiety associated with the zinc or alkali(ne-earth) metal will decompose giving off carbon oxides and/or water and/or hydrocarbons, thereby disappearing at least in part. Particularly preferred salts to be used in an impregnating solution are carbonates, nitrates and carboxylates. Mixtures of zinc or alkali(ne-earth) metal salts, that is, two or more salts with differing anions, differing cations or differing anions and cations can be utilized to prepare the impregnated zeolite.

One method that can be used to prepare tee catalysts utilized in the instant process involves the use of molten zinc salt(s) or zinc plus alkali(ne-earth) metal salt(s) to impregnate the zeolite. In this method a suitable salt(s), that is, one melting below about 850° C., is melted and the zeolite is added to the molten salt(s) or the molten salt(s) is added to the zeolite causing the molten salt(s) to impregnate the pores of the zeolite. A very suitable impregnation technique is to utilize that amount of molten salt that is equal to or less than that amount of molten salt that will just fill the pores of the zeolite. Alternatively, zeolite particles can be immersed in a molten salt bath to cause impregnation of the molten salt into the zeolite followed by separation of the excess molten salt from the zeolite, say by filtration, centrifugation or washing. Alternatively, zeolite particles can be coated with finely divided particles of a suitable salt and heated to above the melting point of the salt, causing the molten salt to impregnate the pores of the zeolite. Many other methods, such as fluid bed impregnation or spraying molten salt or solid salt onto zeolite in a rotating kiln will be obvious to one skilled in the art. After impregnation, the impregnated zeolite is calcined to produce the instant catalysts. The calcining temperature may be the same or lower than the impregnating temperature but frequently it is higher. Drying is not required when the molten salt technique is utilized, but may be utilized to remove residual water remaining in the zeolite. The impregnation and calcination can be carried out in one continuous step or sequence. Metal nitrates and carboxylates are particularly suitable for use in the molten impregnation method.

Another method is to use a sublimable zinc or zinc plus alkali(ne-earth) metal salt to impregnate the zeolite. In this method a suitable salt is sublimed at above its sublimation temperature to produce a vaporous salt and the resulting vapor is contacted with the zeolite maintained at a temperature near or below the sublimation temperature of the salt thereby causing the vapor to condense upon and within the pores of the zeolite thereby impregnating it. Calcination follows to prepare the catalysts utilized in the instant process. Drying before calcination is not required in this case, but may be utilized to remove residual water in the zeolite. The impregnation and calcination can be carried out in one continuous step or sequence.

Most conveniently and preferably, solutions of zinc or zinc plus alkali(ne-earth) metal salts are used to impregnate the zeolites. The solvents utilized to dissolve the salts may be organic or inorganic. The only requirement is that the desired salt(s) be soluble in the particular solvent. Hydroxylic solvents are preferred. Water is a particularly preferred solvent. The lower alkanols are also particularly suitable for use with salts having strong basicity in water in order to minimize base-zeolite structure interactions during the impregnation process. Organic solvents are particularly useful as solvents for zinc and alkali(ne-earth) metal salts which have organic ionic components such as carboxylate, sulfonate, alkoxide, etc. Organic solvents are also useful for inorganic zinc and alkali(ne-earth) metal salts. Zinc or zinc plus alkali(ne earth) metal salts having a low solubility in an organic solvent can be used with that solvent to provide small, but well controlled amounts of zinc or zinc plus alkali(ne-earth) metal to the zeolite while minimizing solvent-base-zeolite structure interactions. Illustrative, but non-limiting examples of organic solvents include alcohols, including polyhydric alcohols, ethers, esters, ketones, amides, sulfoxides and chloro/fluorohydrocarbons such as the various freons. Specific illustrative examples include methanol, ethanol, glycol, dimethyl ether, methyl acetate, methylethyl ketone, dimethyl formamide ("DMF"), dimethyl sulfoxide ("DMSO"), N-methyl pyrrolidone ("NMP"), hexamethylphosphoramide ("HMPA"), dichlorodifluoromethane, methyl chloride, ethylene dichloride, ethylene carbonate, etc. Illustrative, but non-limiting examples of inorganic solvents include water, liquid ammonia, liquid carbon dioxide, liquid sulfur dioxide, carbon disulfide, carbon tetrachloride, etc. Mixtures of solvents which are mutually miscible may be utilized.

A variation on the impregnation technique comprises impregnating the zeolite with a soluble salt of zinc and/or a soluble alkaline earth metal salt, followed by contact or reimpregnation with a precipitating agent, such as a suitable solubilized anion, that will form a precipitate in situ with with the zinc or alkaline earth metal ion. For example, a zeolite is first impregnated with an aqueous solution of zinc nitrate or chloride. Then the impregnated zeolite, without intermediate drying and/or calcining is contacted with an aqueous solution of phosphoric or carbonic acic to precipitate zinc phosphate or carbonate within the zeolite. Similarly, barium or calcium nitrate or chloride could be utilized to impregnate the zeolite prior to or after the zinc precipitation. The barium or calcium impregnated zeolite, without intermediate drying and/or calcining is contacted with an aqueous solution of ammonium sulfate or hydroxide, causing barium or calcium sulfate or hydroxide to precipitate within the zeolite. Zinc and the alkaline earth metal could be simultaneously precipitated by using a precipitating agent that would precipitate both materials, such as an aqueous ammonium hydroxide solution or a carbonic acid solution. This resultant material is then dried as necessary and optionally calcined. Gaseous precipitating agents, such a ammonia or carbon dioxide, may also be utilized. Preferred precipitating agents are those which produce an oxidic compound or a compound which is converted to an oxidic compound upon calcination.

Single or multiple impregnations may be used. When multiple impregnations are used intermediate drying steps, optionally followed by precipitation and/or calcination may be utilized. Generally any amount of impregnating liquid can be used in the impregnation process. For example, the zeolite can be dipped into a large excess (compared to the pore volume of the zeolite), removed and shaken of excess liquid. Alternatively, an amount of impregnating liquid considerably less than the pore volume can be sprayed onto an agitated bed of zeolite. For purposes of economy, control and other reasons, the volume of impregnating liquid will preferably range from about the pore volume to about four or five times, preferably about twice the pore volume of the zeolite to be impregnated. Alternatively, a In another embodiment, baskets of zeolite material are dipped into a vat of impregnating solution, removed, dried and optionally calcined.

The concentration of zinc and optional alkali(ne-earth) metal salts in the impregnating solution is not critical and is selected, inter alia, on the basis of the zeolite used, the amount of ion exchange capacity present in the zeolite, the degree of basicity of the final product desired, the impregnation solvent used and the type of impregnation utilized, that is, multiple or single. Concentrations of zinc and optional alkali(ne-earth) metal salt(s) in the impregnating solution will typically range from about 0.01 moles per liter to the solubility limit of the salt(s). A suitable range is from about 0.01 to about 20 moles per liter, more preferably from about 0.1 to about 10 moles per liter.

The amount of zinc or zinc plus alkali(ne-earth) metal which is impregnated into the zeolite must be in excess of that which would provide a fully cation-ion exchanged zeolite. For example, if the starting zeolite were completely in the hydrogen form and had an ion exchange capacity of 12% (basis $Na_2O$), then the equivalent amount of zinc or zinc plus alkali(ne-earth) metal impregnated (basis $Na_2O$) must exceed the 12%. If the starting zeolite were one which had already been 80% exchanged with a metal cation, the amount of zinc or zinc plus alkali(ne-earth) metal to be added by impregnation would be in excess of that amount required to exchange the remaining 20%. If the starting zeolite were fully metal cation exchanged by any metal, including zinc and/or alkali(ne-earth), then any amount of zinc or zinc plus alkali(ne-earth) metal in the impregnating solution would suffice. For example, if zeolite Y were fully exchanged with copper, then any amount of zinc or zinc plus alkal(ne-earth) metal in the impregnating solution would result in the compositions of the instant invention. It is to be understood that impregnation of a partially or fully cation-exchanged zeolite will most likely result in some counter ion exchange between the impregnating zinc and/or alkali(ne-earth) metal cation(s) and the cations already present in the zeolite, but the resulting catalyst will still be within the scope of the instant invention in having an excess of zinc or zinc plus alkali(ne-earth) metal present over the amount exchanged into the fully exchanged zeolite. When the amount of impregnating solution that is utilized is such that after impregnation no excess solution is removed, then the amount of zinc or zinc plus alkali(ne-earth) metal salt in the impregnating solution will be the same as the amount impregnated into the zeolite. When an amount of impregnating solution is used that requires that an excess amount of solution must be removed, for example, by filtration or centrifugation, from the impregnated zeolite after impregnation, then the amount of zinc or zinc plus alkali(ne-earth) metal in the impregnating solution will exceed the amount of zinc or zinc plus alkali(ne-earth) metal impregnated into the zeolite. In this latter case, the amount of zinc or zinc plus alkali(ne-earth) metal impregnated into the zeolite can be determined by a knowledge of concentration of zinc or zinc plus alkali(ne-earth) metal in the impregnating solution before the impregnation, the concentration of zinc or zinc plus alkali(ne-earth) metal in the excess solution removed from the impregnated zeolite and the amount of solution remaining after impregnation (the excess). Alternatively, the impregnated zeolite can be analyzed for zinc or zinc plus alkali(ne-earth) metal content.

It is a condition of the instant invention that the instant compositions have at least a slight excess of zinc or zinc plus alkali(ne-earth) metal compound present when considered in view of a fully exchanged zeolite. The calculations of the ranges and limits for the zinc or zinc plus alkali(ne earth) compounds are to be made considering the zinc or alkali(ne-earth) metal as the metal (ion) and any metal(s) exchanged into the zeolite as the (ionic) equivalent of an alkali metal. The metal exchanged into the zeolite can be metals other than zinc and alkali(ne-earth) metal. When considering as a basis for calculation the zeolite having no cations exchanged therein, the preferred catalysts will have the sum of the zinc or zinc plus alkali(ne-earth) metal in the zinc or zinc plus alkali(ne-earth) metal compound and any metal cation exchanged into the zeolite being greater than 1, preferably greater than about 1.05, more preferably greater than about 1.1, even more preferably greater than about 1.15, even more preferably greater than about 1.2, even more preferably greater than about 1.5, even more preferably greater than about greater than about 2 times the amount required to provide a fully cation-exchanged zeolite (or times the exchange capacity). When considering the fully cation-exchanged zeolite as a basis for calculation, the amount of zinc or zinc plus alkali(ne-earth) metal in the zinc or zinc plus alkali(ne-earth) metal compound is greater than zero, preferably greater than about 0.05, more preferably greater than about 0.1, even more preferably greater than about 0.15, even more preferably greater than about 0.2, even more preferably greater than about 0.5, and even more preferably greater than about 1 times the amount of alkali(ne-earth) metal that would be required to provide a fully metal cation-exchanged zeolite (or times the exchange capacity). While the above limits are stated in general terms of preference, the actual desired limits will depend on the particular application for which the composition is designed.

After impregnation utilizing an impregnating solution and/or a subsequent precipitating solution, the impregnated zeolite is dried to remove the solvent of the impregnating and/or precipitating solution. The drying conditions are not critical to the instant invention. Drying may be carried out at atmospheric pressure, superatmospheric pressure or under vacuum. It also may be carried out by passing a dry (with regard to the impregnating solvent) gas over a bed of the zeolite. Drying temperatures will depend upon the solvent used. For those solvents that are liquid at low temperatures, such as liquid carbon dioxide or liquid sulfur dioxide, the drying temperature can be relatively low, that is, below room temperature. For the more conventional solvents which are liquid at or above room temperature, higher temperatures will be used. For these solvents temperatures will typically range from about room temperature to about 200° C. In most cases drying temperatures will be less than about 200° C., preferably less than 150° C. Drying times are dependent upon the drying temperature and pressure, typically from about one minute to about twenty hours, although longer or shorter times can be utilized. Drying atmospheres and pressures are normally not critical. The drying atmosphere may be neutral, oxidizing, reducing or a vacuum.

After drying to remove an impregnating solvent or after impregnation by means of a molten or vaporous salt, the impregnated zeolite is optionally calcined at elevated temperatures. Calcination conditions will range from about 150° C. to about 850° C., preferably from about 200° C. to about 750° C., and more preferably from about 400° C. to about 650° C. Calcining times are dependent on the calcining conditions selected and typically range from about one minute to about twenty hours, although longer or shorter times can be utilized. Calcining conditions and times are also adjusted according to the thermal stability. Calcination conditions should not be so extreme as to cause extreme loss of zeolite crystallinity. Calcining atmospheres may be neutral, oxidizing or reducing. When the impregnating salt has an anionic component which does not contain oxygen, an oxygen-containing calcining atmosphere is preferably utilized. Neutral atmospheres such as provided by nitrogen and oxidizing atmospheres such as provided by air are preferred.

In a preferred embodiment when using an impregnation or an impregnating/precipitating solution, the drying and calcining steps are combined into one integrated process step. In this combined step the impregnated zeolite is heated through the lower temperatures at a rate slow enough that physical disruption of the zeolite does not occur due to rapid volatilization of the solvent from the impregnation. After the solvent has been removed, the zeolite is then heated to the desired calcining temperature, maintained for the desired calcining time and then cooled to room temperature. Calcining (and drying) can be carried out in situ during the operation of a catalytic process in a catalytic reactor.

The exact form of the zinc or zinc plus alkali(ne-earth) metal after calcination is not known. Without intending to limit the scope of the instant invention, it is believed that the zinc or zinc plus alkali(ne-earth) metal(s) is present as one or more zinc or zinc plus alkali(ne-earth) metal oxidic compounds. It is speculated that the excess (e.g., non-ion exchanged) zinc or zinc plus alkali(ne-earth) metal compound(s) are probably in the form of a surface oxide or multiple surface oxides with the zeolite, in particular with the aluminum and/or silicon and/or oxygen of the zeolite lattice, possibly in combination with species contained in or formed from the impregnation solution or during the calcination process.

The calcination contributes to the production of a catalyst which is basic and this basic nature is thought to derive from the particular nature of the zinc or zinc plus alkali(ne-earth) metal compound present after calcination. However, those catalysts produced by precipitation with a basic precipitating agent are within the scope of the instant invention, even without calcination taking place. The basic nature of these materials can be seen from the fact that instant catalysts when placed in a solvent produce effects that are basic rather than acidic in nature. This can be seen by the use of suitable chemical or electrochemical indicators.

The basicity of the instant catalysts can be determined in various ways. For example, it can be determined by measuring the extent to which various base-catalyzed reactions are carried out in the presence of of the instant catalysts. Another method is to place the instant catalyst in a solvent and measure the resulting pH by use of chemical or electrochemical indicators. A specific example would involve placing 20 mg of catalyst in 2 g of water and using a pH meter or pH paper to measure the resulting pH. Another method is to use various indicators in non-aqueous solutions and compare the indicator response caused by the instant catalysts with the indicator response caused by selected reference samples. Suitable indicators are 4-nitroaniline or 4-chloroaniline dissolved in dimethyl sulfoxide ("DMSO") or benzene (@0.1 g/cc). Examples of indicator responses with various reference samples is shown in Table 1 below.

TABLE 1

| Reference | 4-nitroaniline/DMSO | 4-chloroaniline/benzene |
| --- | --- | --- |
| $NaNH_2$ | very dark blue | purplish brown |
| KOH | dark blue | cream |
| NaY-Zeolite | yellow | cream |
| amorphorous $SiO_2$ | faint yellow | cream |

In general terms the compositions-of-matter of the instant invention comprise a basic, structured, that is a zeolitically structured, zinc or zinc plus alkali(ne-earth) metal-containing aluminosilicate containing in compound form an excess of zinc or zinc plus alkali(ne-earth) metal over that necessary to provide a fully metal cation-exchanged aluminosilicate. More specifically, the instant catalysts comprise a zeolite and a zinc or zinc plus alkali(ne-earth) metal compound, particularly an oxidic compound, wherein the sum of the amount of the zinc or zinc plus alkali(ne-earth) metal in the compound plus any metal cation exchanged into the zeolite is in excess of that required to provide a fully metal cation-exchanged zeolite. The zinc or zinc plus alkali(ne-earth) metal compound will be found deposited on the surface of the zeolite. The instant catalysts will contain at least a portion of their pore volume in micropores in the range of from about three to about twelve angstroms. The instant catalysts react as bases when placed in solvents and catalyze base-catalyzed reactions. In a preferred embodiment for shape selective catalysis, the excess zinc or zinc plus alkali(ne-earth) metal compound is substantially located on the internal pore surfaces of the zeolite rather than the external surfaces.

The instant catalysts retain at least a portion of a crystalline zeolite structure. The term "crystalline" is employed herein to designate an ordered structure capable of being detected by electrooptical or diffraction techniques, normally by X-ray diffraction, giving a consistent crystallographic pattern. Such an ordered structure can persist even after some of the structural silica or alumina is removed from the crystal lattice, as by leaching with acids, or with bases such as might occur during the impregnation process, or by other physical or chemical methods. Sometimes the ordered structure may become so attenuated by these or other means as to fail to diffract X-rays, but in such cases other electrooptical methods, such as electron beam diffraction may be utilized. In other cases the crystallite size may become so small that diffraction effects may become so diffuse that the amount of crystalline structure may be difficult to detect or determine. In this latter instance, however, the retention of a large surface area after chemical and/or physical processing will indicate the retention of a certain amount crystalline zeolite structure. Thus these latter materials are still structured aluminosilicates as opposed to amorphous aluminosilicates and are within the scope of the instant invention.

The catalysts utilized in the instant process, alone or in combination with other catalytic components, may be distributed throughout an inert inorganic diluent which also may serve as a binder. Non-limiting examples of such diluents include aluminas, silicas, silica-aluminas, charcoal, pumice, magnesia, zirconia, keiselguhr, fullers' earth, silicon carbide, clays and other ceramics. In a preferred use of binders the instant zeolitic catalysts are intimately mixed a finely divided, hydrous, refractory oxide of a difficulty reducible metal. The term "hydrous" is used to designate oxides having structural surface hydroxyl groups detectable by infrared analysis. The preferred oxides are alumina, silica, magnesia, beryllia, zirconia, titania, thoria, chromia, and combinations thereof such silica-alumina, silica-magnesia, and the like. Naturally occurring clays comprising silica and alumina may also be utilized, preferably after acid treatment. The metal oxide can be combined with the instant catalysts as a hydrous sol or gel, an an anhydrous activated gel, a spray dried powder or a calcined powder. In one modification a sol or solution of the metal oxide precursor such as an alkali metal silicate or aluminate can be precipitated to form a gel in the presence of the catalysts utilized in the instant process. When less hydrous forms of the metal oxide are combined with the instant catalysts, essentially any method of effecting intimate admixture of the components may by utilized. One such method is mechanical admixture, e.g. mulling, which involves admixing the instant catalysts in the form of a powder with the slightly hydrous, finely divided form of the metal oxide. The diluent or binder may be added to the instant catalysts at any point in their preparation, that is, before, during or after impregnation, drying and/or calcination.

The instant compositions can also serve as catalysts or catalyst supports for other catalytic components. Catalytic components may be incorporated into the instant compositions at any stage of their preparation, that is, prior to, during and after the conversion of the starting zeolite to final basic composition. Large numbers of materials can be added to the compositions of the instant invention in order to make catalysts. Illustrative but non-limiting examples include the transition metals (atomic nos. 21-29, 39-47, 72-79); Group IIB metals (atomic nos. 48, 80); Group IIIA metals (atomic nos. 5, 13, 31, 49, 81); Group IVA metals (atomic nos. 14, 32, 50, 82); Group VA metals (atomic nos. 15, 33, 51, 83); Group VIA metals (atomic nos. 34, 52); the lanthanide metals (atomic nos. 57-71), as well as their oxides, sulfides, halides, salts, complexes, compounds and the like.

The ranges and limitations provided in the instant specification and claims are those which are believed to particularly point out and distinctly claim the instant invention. It is, however, understood that other ranges and limitations that perform substantially the same function in substantially the same way to obtain the same or substantially the same result are intended to be within the scope of the instant invention as defined by the instant specification and claims.

The following illustrative embodiments are provided for illustration and are not to be construed as limiting the invention.

ILLUSTRATIVE EMBODIMENT I

The catalysts utilized were prepared as follows:

Catalyst Preparation

Fully sodium exchanged zeolite Y (LZY-52 from Union Carbide Corporation) was used as comparative catalyst and to prepare examples CC-1, CC-2 and C-1 through C-7. Fully calcium metal exchanged zeolite 5A was used to prepare example C-8 and fully sodium metal exchanged zeolite 13X was used to prepare examples C-9 and C-10.

The following examples illustrate the preparation of the compositions of the instant invention as well as comparative compositions.

Comparative Composition CC-1 (Washed LZY52)

496.6 Grams of LZY52 powder were slurried with 5 liters Barnstead water for 50 minutes and then filtered. The cake was slurried again with 5 liters Barnstead water for 55 minutes and then filtered. 1 liter Barnstead water was added to the filter and allowed to filter through the cake. The cake was then dried 104 min in a 150° C. vacuum oven. The dried material was calcined at 575° C. for two hours in flowing nitrogen.

Comparative Composition CC-2 (ZnY)

20 Grams of LZY52 (directly out of the can) were slurried at 60° C. for 1.25 hrs with 500 cc 1M $Zn(NO_3)_2$ solution, then filtered. This was repeated two more times, then 500 cc Barnstead water was poured through the filter. The cake was then dried overnight in a 150° C. vacuum oven. The dried material was calcined at 575° C. for 2 hours in flowing nitrogen.

Composition C-1 ($Zn(NO_3)_3$/washed LZY52)

35.30 Grams of washed LZY52 (CC-1) were impregnated with 6.98 g $Zn(NO_3)_3$ hydrate (Mallinkrodt) (quite moist) dissolved in 2.5 cc Barnstead water. The impregnation was done in a dish and allowed to sit 82 min., then dried 110 min in a 150° C. vacuum oven. 4 cc water was added to the dried material, then it was allowed to sit 38 min., then dried 82 min. in a 150° C. vacuum oven. The dried material was placed in a vycor tube in an upright furnace with a nitrogen flow of 300 cc/min. The next day, the material was calcined at 575° C. for 2 hrs and then cooled. The material was bottled in the dry box.

Composition C-2 ($Fe(NO_3)_2$/$Zn(NO_3)_2$/washed LZY52)

20.32 Grams of washed LZY52 and 5.15 g $Zn(NO_3)_3$ hydrate (Aldrich) were placed in a 250 cc round bottom flask equipped with a stir bar, a condensor, and a gas inlet attached to nitrogen and a bubbler. The materials were kept blanketed with nitrogen. The flask was heated to 100°–146.8° C. and kept there for 2 hrs. The cooled material was placed in a vycor tube in an upright furnace, with a nitrogen flow of 425 cc/min. The tube was heated to 600° C. for 2 hrs, then cooled. The contents of the tube were placed in a dish, impregnated with 0.5407 g $Fe(NO_3)_3.9H_2O$ dissolved in 2 cc Barnstead water, then allowed to sit 35 mins., then dried 78 min. in a 150° C. vacuum oven. The dried material was placed in a vycor tube.

Composition C-3 (KOH/$Zn(NO_3)_2$/washed LZY52)

In the dry box, 5.04 grams of $Zn(NO_3)_2$/washed LZY52 (C-1) were placed in a dish and then brought out. This was then impregnated with 1 cc 1N KOH solution, then allowed to sit 31 min, and then dried 2.18 min. in a 150° C. vacuum oven. The dried material was calcined in flowing nitrogen at 575° C. for 2 hours.

Composition C-4 (KOH/$Zn(NO_3)_2$/washed LZY52)

51.02 Grams of washed LZY52 were impregnated with 10.07 g $Zn(NO_3)_2$ hydrate (quite moist) dissolved in 3.6 cc water. The impregnation was carried out in a dish, then allowed to sit 49 min., then dried 86 min. in a 150° C. vacuum oven. The dried material was stirred with 250 cc 1N KOH for 1 hour, filtered, stirred with another 250 cc 1N KOH, and then filtered again. The cake was dried 4.5 hours in a 150° C. vacuum oven. The dried material was calcined in flowing nitrogen for 2 hours at 575° C.

Composition C-5 ($Zn(NO_3)_2$/washed LZY52 calcined overnight)

$Zn(NO_3)_2$/washed LZY52 (prepared the same as C-1, but not calcined) was placed in a vycor tube and placed in an upright furnace, then with nitrogen flowing (325 cc/min.) heated to 575° C. After 16 hours, the furnace was cooled and the contents of the tube were bottled in the drybox.

Composition C-6 ($Zn(NO_3)_2$/ZnY)

7.99 Grams of ZnY (CC-2) was impregnated with 1.6 g $Zn(NO_3)_2$ hydrated dissolved in 0.57 cc Barnstead water. The impregnation was carried out in a dish, allowed to sit 30 minutes, then dried 73 min. in a 150° C. vacuum oven. The dried material was placed in a vycor tube in an upright furnace and with nitrogen flowing (300 cc/min.) heated to 575° C. After about 2 hours, the furnace was cooled and the contents of the tube bottled in the drybox.

Composition C-7 ($Zn(NO_3)_2$/5A)

The calcium form of zeolite A (from Union Carbide Corporation) was used as the base zeolite. It was washed before use in a manner similar to that described in example CC-1 above.

34.91 Grams of washed 5A zeolite were impregnated with 7.09 grams of zinc nitrate dissolved in 2.5 cubic centimeters Barnstead water. The impregnation was done in a dish, allowed to sit 53 minutes, then dried 1.33 hours in a vacuum oven at 150° C. The powder was treated with 4 cubic centimeters of water, allowed to sit 25 minutes and then dried overnight in a vacuum oven at 150° C. The dried material was calcined in flowing nitrogen at 575° C. for two hours.

Composition C-8 ($Zn(NO_3)_2$/13X)

The sodium form of zeolite 13X (from Union Carbide Corporation) was used as the base zeolite. It was washed before use in a manner similar to that described in example CC-1 above.

35.24 Grams of washed 13X zeolite were impregnated with 7.08 grams of zinc nitrate dissolved in 2.5 cubic centimeters Barnstead water. The impregnation was done in a dish, allowed to sit 53 minutes, then dried 1.33 hours in a vacuum oven at 150° C. The powder was treated with 4 cubic centimeters of water, allowed to sit 25 minutes and then dried overnight in a vacuum oven at 150° C. The dried material was calcined in flowing nitrogen at 575° C. for two hours.

Composition C-9 (KOH/$Zn(NO_3)_2$/13X)

The sodium form of zeolite 13X (from Union Carbide Corporation) was used as the base zeolite. It was washed before use in a manner similar to that described in example CC-1 above.

50.76 Grams of washed 13X zeolite were impregnated with 10.10 grams of zinc nitrate dissolved in Barnstead water. The impregnation was done in a dish, allowed to sit 25 minutes and then dried overnight in a vacuum oven at 150° C. The powder was then slurried with 250 cubic centimeters of 1N KOH solution for one hour and then filtered. This KOH treatment was repeated. The solid was then dried 1.75 hours in a vacuum oven at 150° C. The dried material was calcined in flowing nitrogen at 550° C. for one hour.

ISOMERIZATION PROCESS

Background

Double bond isomerization is a reaction catalyzed by basic and acidic catalysts. Basic catalysts are normally more selective, since they do not generate cations which can undergo skeletal isomerizations. The instant compositions are particularly useful for double bond isomerization. When compared to a standard sodium exchanged zeolite Y, the instant compositions show less hydrogen transfer, resulting in less alkane make. The instant catalysts also show significantly less cracking than the sodium Y zeolite and very low aromatic make. Decrease in cracking activity is consistent with a decrease in acid function.

The instant compositions are thus particularly useful for the isomerization of additive range ($C_4$ to $C_8$) olefins and detergent range ($C_{10}$ to $C_{18}$) olefins, although higher range olefins can be isomerized. Isomerization is carried out in a gas or liquid phase at isomerization conditions. Isomerization conditions typically include a temperature in the range of from about 0° C. to about 500° C., preferably from about 100° C. to about 150° C., a pressure in the range of from about 1 psig to about 2000 psig and a weight hourly space velocity in the range of from 0.01 to about 20.

Experimental Test Procedure

Isomerization catalysts were tested in a stainless steel flow reactor measuring 14.75" in length and 0.625" in internal diameter. The reactor was packed bottom to top as follows: a small wad of glass wool, 33 cc of catalyst, a small wad of glass wool, 25 cc 80 grit silicon carbide, followed by another small wad of glass wool. The reactor was operated in a vertical mode in an upright furnace. The feed entered from the top. During isomerization the reactor was operated at the temperature specified in the tables below for about one hour with a nitrogen flow rate of about 20 l/h and a 1-octene flow rate of about 6-10 g/h. After about one hour of operation a gas sample was taken and analyzed. Organic liquid which had been collected in a dry ice trap for the duration of the run was also analyzed. Results reported in the table below.

| Catalyst | Temp, °C. | Products, % wt | | | Cracking |
| --- | --- | --- | --- | --- | --- |
| | | 1-Octene | 2-Octene | 3 & 4-Octene | |
| NaY[1] | 400 | 67.6 | 15.7 | 12.0 | 1.58 |
| ZnO/NaY[2] | 25 | 96.8 | 2.5 | — | 0.15 |
| " | 100 | 91.7 | 4.3 | 3.7 | 0.15 |
| " | 120 | 81.3 | 13.1 | 5.1 | 0.16 |
| " | 150 | 60.8 | 28.5 | 48.4 | 0.24 |
| " | 200 | 14.2 | 42.0 | 40.9 | 1.39 |
| " | 275 | 5.9 | 34.8 | 54.1 | 3.78 |
| ZnO/NaY[3] | 250 | 2.0 | 46.4 | 47.9 | 0.9 |
| ZnO/KOH/NaY[4] | 200 | 72.2 | 25.1 | tr. | 0.27 |
| " | 250 | 77.2 | 22.0 | tr. | 0.28 |
| " | 400 | 36.2 | 61.0 | 0.8 | 0.59 |
| ZnO/KOH/NaY[5] | 400 | 3 | 49 | 47.6 | 0.62 |
| ZnO/ZnY[6] | 100 | 0.4 | 82.5 | 8 | 0.3 |
| ZnO/Ca5A[7] | 275 | 38.7 | 31.4 | 29.5 | — |
| ZnO/Na13X[8] | 275 | 65.1 | 25.2 | 7.6 | — |
| ZnO/KOH/Na13X[9] | 275 | 53.4 | 32.4 | 12.9 | — |

[1]Sample preparation similar to CC-1.
[2],[3]Sample preparation similar to C1.
[4],[5]Sample preparation similar to C-4.
[6]Sample preparation similar to C-6.
[7]Sample preparation similar to C-7; liquid product analysis only reported.
[8]Sample preparation similar to C-8; liquid product analysis only reported.
[9]Sample preparation similar to C-9; liquid product analysis only reported.

What is claimed is:

1. A composition-of-matter prepared by impregnating a zeolite with a solution of a zinc or zinc plus alkali(ne earth) metal salt wherein the sum of said zinc or zinc plus alkali(ne earth) metal impregnated into the zeolite and any metal cation exchanged into the zeolite is in excess of that required to provide a fully metal cation-exchanged zeolite, drying the impregnated zeolite product and subsequently calcining the dried product at a temperature ranging from about 200° C. to about 750° C.

2. The composition-of-matter of claim 1 wherein, in the process for preparing the composition, the zeolite is first impregnated with a solution of a zinc and/or an alkaline earth metal salt and is subsequently contacted with a precipitating agent whereby an insoluble zinc and/or alkaline earth metal compound precipitates within the zeolite.

3. The composition-of-matter of claim 2 wherein the precipitating agent is an aqueous solution of a hydroxly-containing compound.

4. The composition-of-matter of claim 3 wherein the precipitating agent is an aqueous solution of an alkali metal hydroxide, ammonium hydroxide or a mixture thereof.

5. The composition-of-matter of claim 4 wherein the zinc and/or alkaline earth metal salt in the impregnating solution is not a hydroxide.

6. The composition-of-matter of claim 1 wherein the calcination temperature is between about 400° C. and about 650° C.

7. The composition-of-matter of claim 1 wherein the calcination is carried out in a nitrogen or air atmosphere.

8. The composition-of-matter of claim 1 wherein the zeolite is selected from zeolite Y, zeolite X, zeolite A and mixtures thereof.

9. Process for the preparation of a basic zinc-containing zeolite, comprising impregnating a zeolite with a solution of a zinc or zinc plus alkali(ne earth) metal salt wherein the sum of said zinc or zinc plus alkali(ne earth) metal impregnated into the zeolite and any metal cation exchanged into the zeolite is in excess of that required to provide a fully metal cation-exchanged zeolite, drying the impregnated zeolite product and subsequently calcining the dried product at a temperature ranging from about 200° C. to about 750° C.

10. The process of claim 9, wherein the zeolite is first impregnated with a solution of a zinc and or an alkaline earth metal salt and is subsequently contacted with a precipitating agent whereby an insoluble zinc and/or alkaline earth metal compound precipitates within the zeolite.

11. The process of claim 10, wherein the precipitating agent is an aqueous solution of a hydroxyl-containing compound.

12. The process of claim 11, wherein the precipitating agent is an aqueous solution of an alkali metal hydroxide, ammonium hydroxide or a mixture thereof.

13. The process of claim 12, wherein the zinc and/or alkaline earth metal salt in the impregnating solution is not a hydroxide.

14. The process of claim 9, wherein the calcination temperature is between about 400° C. and about 650° C.

15. The process of claim 9, wherein the calcination is carried out in a nitrogen or air atmosphere.

16. The process of claim 9, wherein the zeolite is selected from zeolite Y, zeolite X, zeolite A and mixtures thereof.

* * * * *